US007839728B2

(12) United States Patent
Fukushima

(10) Patent No.: US 7,839,728 B2
(45) Date of Patent: Nov. 23, 2010

(54) OPTICAL DISC RECORDING DEVICE

(75) Inventor: Akio Fukushima, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 542 days.

(21) Appl. No.: 11/295,360

(22) Filed: Dec. 5, 2005

(65) Prior Publication Data
US 2006/0262681 A1 Nov. 23, 2006

(30) Foreign Application Priority Data
May 19, 2005 (JP) ............... 2005-146138

(51) Int. Cl.
*G11B 7/00* (2006.01)
(52) U.S. Cl. ............... 369/30.05; 369/47.12; 369/53.22
(58) Field of Classification Search ............ 369/47.14, 369/52.1, 58.17, 53.15–53.35
See application file for complete search history.

(56) References Cited

U.S. PATENT DOCUMENTS

| 4,821,251 | A * | 4/1989 | Hosoya ................... 369/44 |
| 6,424,607 | B2 * | 7/2002 | Fujinami et al. ......... 369/47.28 |
| 6,571,053 | B1 * | 5/2003 | Yasuzato .................. 386/83 |
| 6,584,272 | B1 * | 6/2003 | Fukushima et al. ....... 386/46 |
| 6,813,107 | B1 * | 11/2004 | Lee ......................... 360/39 |
| 2005/0265183 | A1 * | 12/2005 | Kakimoto et al. ........ 369/47.53 |

FOREIGN PATENT DOCUMENTS

| JP | 06-044563 A | 2/1994 |
| JP | 10-011755 | 1/1998 |
| JP | 2001-256649 A | 9/2001 |
| JP | 2002-197682 | 7/2002 |
| JP | 2002-319135 A | 10/2002 |
| JP | 2003-030837 A | 1/2003 |
| JP | 2003-257039 A | 9/2003 |
| JP | 2004-326933 A | 11/2004 |

OTHER PUBLICATIONS

Japan Patent Office (JPO) office action for JPO patent application JP2005-146138 (Dec. 15, 2009).

* cited by examiner

*Primary Examiner*—Wayne R Young
*Assistant Examiner*—Brian Butcher
(74) *Attorney, Agent, or Firm*—Townsend and Townsend and Crew LLP

(57) ABSTRACT

A technique for investigating differences of composition and structural state of a recording layer of an optical disc along with other defects, such as scratches, contamination, warp and distortion, prior to video recording and for setting up appropriate recording conditions in compliance with this result to thereby perform recording is disclosed. In an optical disc recording device capable of recording information on an optical disc, a region to be investigated is defined based on the video recording reservation contents. Then, investigate and evaluate the disc state which can affect the recording quality in a target disc region to be recorded. Next, based on investigation/evaluation results, perform recording setup, recording speed setup, servo control setup and recording position setup to thereby perform the recording. By appropriately modifying the recording setup on a case-by-case basis, it is possible to achieve high-quality recording.

8 Claims, 3 Drawing Sheets

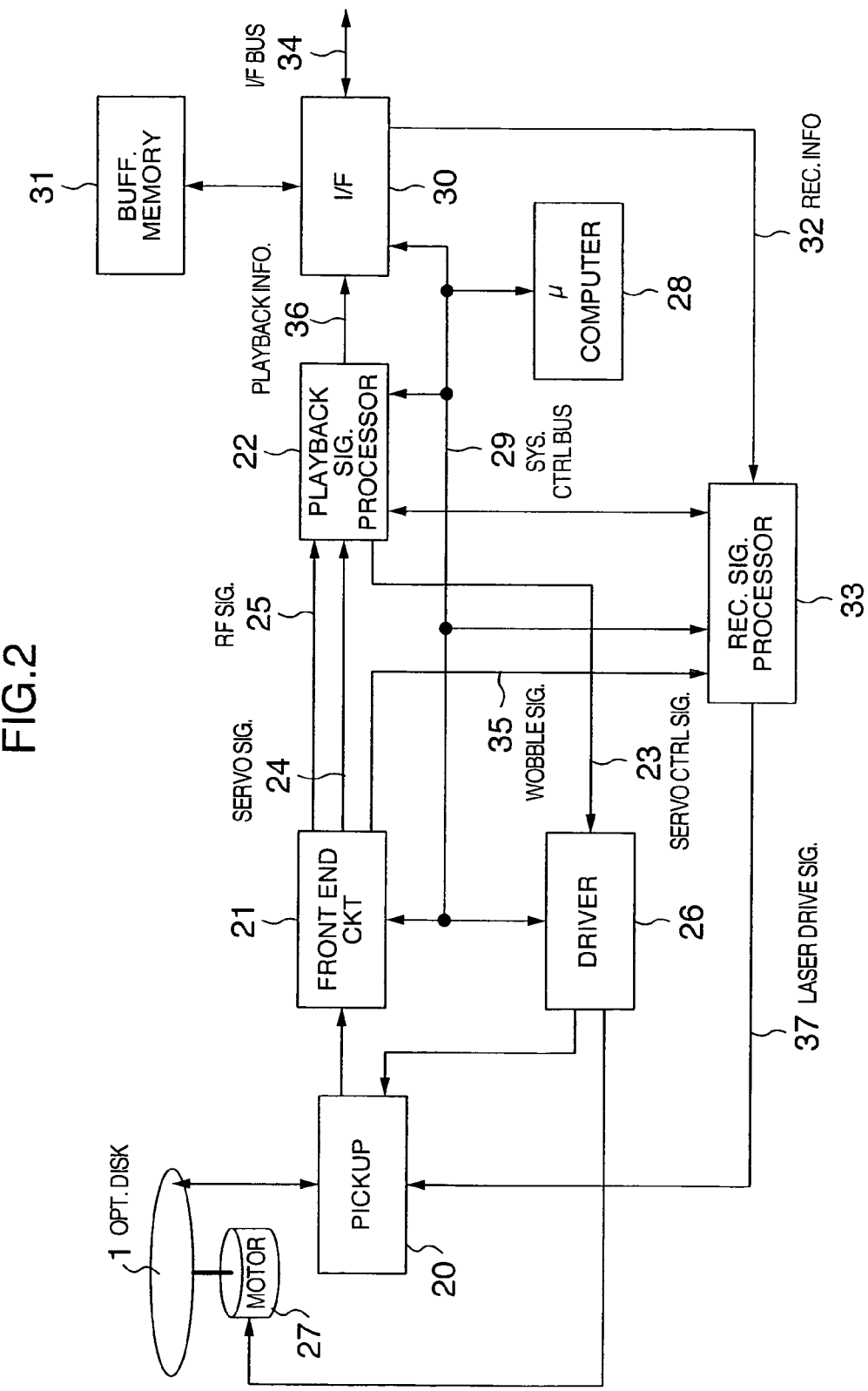

OPTICAL DISC RECORDING DEVICE

INCORPORATION BY REFERENCE

The present application claims priority from Japanese application JP2005-146138 filed on May 19, 2005, the content of which is hereby incorporated by reference into this application.

BACKGROUND OF THE INVENTION

1. Field of the Invention

The present invention relates to optical disc recording devices capable of recording information to optical discs.

2. Description of the Related Art

In optical disc recording devices, optical power control (OPC) and trial writing control are performed in order to enable achievement of video-recording with higher quality by investigating, prior to such recording, the state of an optical "disc" on which information is recorded and then changing recording conditions in compliance with the investigation result. The OPC and trial write are required in view of the variability of once-optimized recording conditions under influence of the recording layer composition and/or structure of such optical disc, and are to actually perform recording while varying the recording conditions, such as on-recording power intensity and recording strategies, for evaluating its result to thereby obtain the optimum recording conditions on a per-disc basis. Examples of this approach are disclosed, for example, in JP-A-2002-197682 and JP-A-10-11755.

SUMMARY OF THE INVENTION

The OPC and trial write are the processing for obtaining the optimum recording conditions in a way pursuant mainly to differences in composition and/or structural state of the recording layer of an optical disc. However, in regard to the optical disc state that can affect the recording on optical disc, there are various factors other than the recording-layer composition/structural state differences, examples of which are disc warp and distortion occurring due to optical disc molding and casting conditions, local recording-layer shape abnormality due to the presence of contaminants attached to a stamper during disc manufacture, track shape abnormality due to optical disc stamper fabrication conditions, surface scratches and dust/contaminant attachment due to inadequate disc handling, with-time state change of the recording layer, and peel-off of disc's laminate portions due to disc fabrication conditions and improper handling. Regarding these factors, it is hardly possible to set up any optimal recording conditions through mere execution of the OPC and trial write.

Consequently, in order to perform successful recording to optical discs, it is a must to develop a technique for investigating in advance the above-noted various kinds of factors as well as the differences in optical disc record-layer composition and structural state and for establishing optimal recording conditions pursuant to the investigation results to thereby perform recording.

To attain this objective, there is provided an optical disc recording device which includes an optical disc recorder unit operative to record information in a recordable region of an optical disc, a signal output for outputting recording information to the optical disc recorder unit and the signal output unit, and a record information setup unit for setting in the control unit the contents of information to be recorded. Based on the contents being set to the control unit by the information setup unit, define a region of the recordable area of the optical disc which is pre-assigned or "scheduled" to be used for a recording as a recording-reserved region. Then, investigate a present state of the recording-reserve region before the optical disc recorder records the information as set to the control unit by the record information setup unit. The investigation result is recorded on a second information recording medium. Based on a result obtained by reading a state of the recording-reserved region recorded on the second information recording medium, perform the setting of certain condition in a recording event of the optical disc recorder.

More specifically, the processing is performed in a way which follows. Firstly, a recording reservation is made and at a time point whereat it is ascertained that recording is done to an optical disc, obtain from the reservation contents an optical disc region to be recorded, that is, a recording-preassigned region. As the reservation contents contain several information items such as recording start date-and-time, recording end date/time, on-recording picture quality setup and others, it is possible to estimate a recording-required data capacity from a recording time and record bit rate which are obtained from these information items. Thus, based on the estimated data capacity and optical disc's blank area capacity, it is possible to define an optical-disc region to be used for the intended recording—i.e., the recording-preassigned or "premeditated" region.

Next, while defining as a target area to be investigated a region which contains at least part of the recording-preassigned region, investigate the state of optical disc in its investigation area at an appropriate time point, followed by letting its result be stored in a specified recording medium. The recording medium as used here for storage of the investigation result may be at least one of a hard disc drive (HDD) which is built in an optical disc recorder or externally connected thereto, a semiconductor memory, and an optical disc to be recorded.

When recording information on the optical disc based on the recording reservation, the optical-disc state investigation result that is read out of the recording medium is used to set up several recording conditions including, but not limited to, the optimum recording speed, on-recording optical power, recording strategy, during-recording servo control, during-recording phase-locked loop (PLL) control, wobble/address signal detection systems, and a recording position on the target optical disc; then, actual recording gets started.

It is possible to achieve high-quality recording by performing investigation/evaluation of the disc state which can affect the recording quality in the to-be-recorded region of the optical disc being recorded and appropriately changing the recording settings based on such results in a way pursuant to the circumstances of each individual case.

According to this invention, it is possible to perform recording with higher video quality and enhanced reliability.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram of an optical disc drive.

DETAILED DESCRIPTION OF THE INVENTION

Currently preferred embodiments of this invention will be described with reference to the accompanying drawings below.

Embodiment 1

Although in the embodiments below an explanation will be given while exemplifying an optical disc recording device which has a built-in hard disc drive (HDD) unit and which is designed to perform recording to such HDD or a digital versatile disc random access memory (DVD-RAM) disc, the invention should not exclusively be limited thereto and may be applied to other types of optical disc recording devices with recordability to various kinds of recording media including, but not limited to, compact disc-recordable (CD-R), CD-rewritable (CD-RW), DVD–RW, DVD+RW, DVD+R, and next-generation ultra-large capacity optical discs, such as Blu-ray (BR) and HD-DVD, and further applicable to optical disc recorder devices of the type other than the above.

Figure 1:
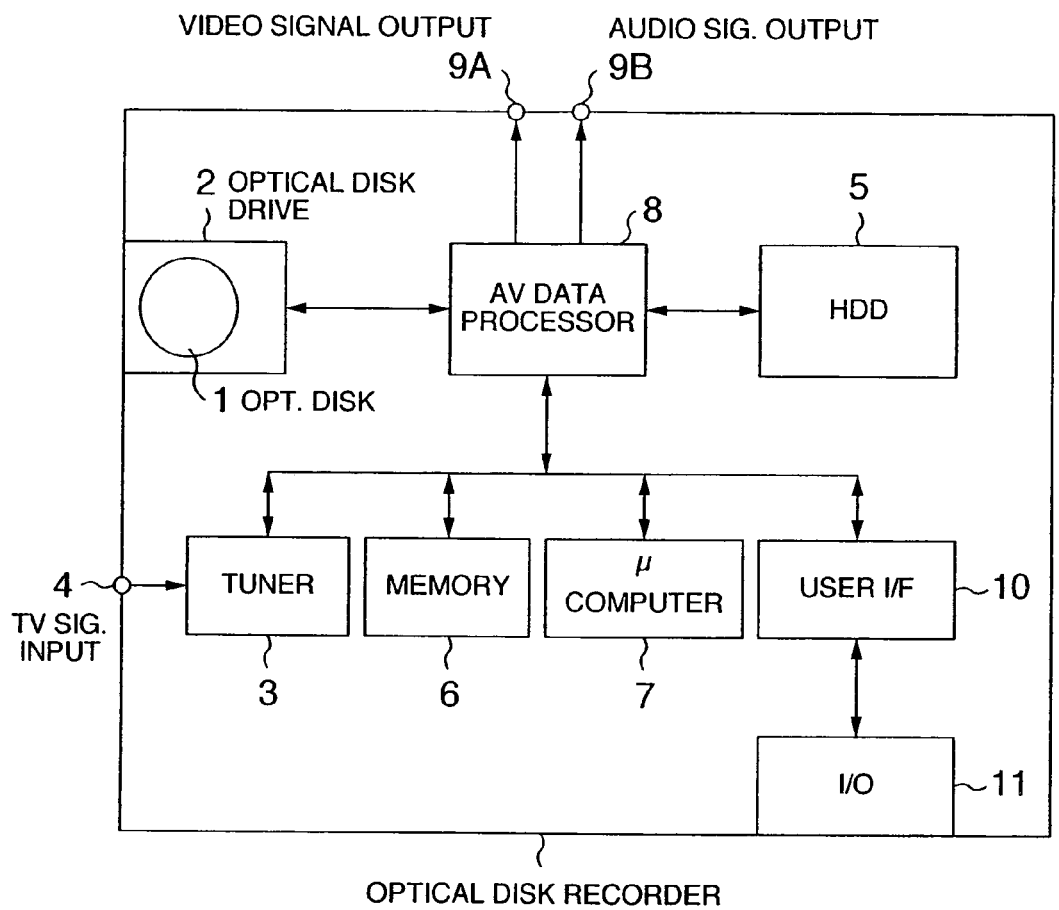
FIG. 1 is a block diagram of an optical disc recorder.

FIG. 1 is a block diagram of an optical disc recorder (simply referred to as "recorder" hereinafter) embodying the invention. An explanation of the recorder per se will first be set forth as the invention is relevant to the video-recording reservation/program processing and videorecording processing in such recorder.

The recorder includes a microcomputer 7, which provides control over an entire system of the recorder with the aid of a memory 6. A television (TV) broadcast signal is input to a TV signal input terminal 4, which is connected to a tuner 3 for performing demodulation. A demodulated signal is then passed to a video/audio data processing circuit 8. This circuit 8 converts the signal as input from tuner 3 into a signal suitable for video/audio output devices such as a display unit and speakers (not shown), and then generates converted signals from its video signal output terminal 9A and audio signal output terminal 9B. Broadcast program video-recording is performed by recording to the built-in HDD 5 the data converted by the video/audio processor circuit 8 into a specific format and a bit rate suitable for the recording; alternatively, an optical disc drive 2 is used to record the data on an optical disc 1 being loaded thereinto.

Reproduction of the broadcast program recorded is done by readout from the HDD 5. Alternatively, the optical disc drive 2 is used to play back the data from the optical disc 1, which data is then converted by the video/audio processor circuit 8 into a signal with its format adapted for the video/audio output device (not shown) and then output from the video/audio output terminals 9A-9B. Additionally a user performs necessary operations using an input/output device 11, such as a remote controller, switch(es) and display device (neither is depicted) through a user interface 10.

An explanation will next be given of a processing procedure in case a broadcast program video-recording operation is performed to the optical disc 1 by using a timer videorecording function. A processing routine in prior known recorders will first be discussed.

The user uses the user interface 10 to input several information items necessary for making a reservation or "booking" of videorecording, such as his or her preferred broadcast program start time-and-date, end time/date, recording picture quality, TV channel and others. The microcomputer 7 which provides control over the entirety of the recorder operates to estimate a data amount required for the recording based on the input reserved videorecording information and also sends forth a command(s) for inquiring an amount of blank or "vacant" storage area of the optical disc 1 toward the optical disc drive 2 from the video/audio processor circuit 8, which performs command transmission and reception to and from the optical disc drive 2. The optical disc drive 2 investigates a blank storage amount of the optical disc 1 and then returns its result to the video/audio processor circuit 8. The microcomputer 7 operates so that if the blank storage amount of optical disc 1 as returned from the optical disc drive 2 is greater than the data amount required for the recording session and also is large enough to complete the videorecording, then execute other necessary processing, such as setting of a timer circuit (not shown). Thereafter, the microcomputer 7 goes into a standby mode until arrival of a recording preparation start time for the earliest reserved videorecording event.

When it becomes the reserved videorecording preparation start time, the timer renders the recorder operative, so the recording preparation processing relative to the optical disc 1 gets started. This recording preparation processing includes a process for permitting the optical disc drive 2 to perform recording to the optical disc 1 under appropriate conditions, which process in turn involves optical power control (OPC) and trial writing steps, for example.

The OPC and trial write are provided in view of the fact that optimal recording conditions can vary under the influence of the composition and structure of a recording layer of the optical disc, for performing a recording operation to a certain region of the optical disc while at the same time modifying the recording conditions such as the on-recording optical power intensity and record strategy or the like, and then reproducing a recorded portion to thereby evaluate a recorded state, and next obtaining based on evaluation results the optimum recording conditions per optical disc.

Next, a processing procedure in the recorder embodying this invention will be described below.

The illustrative embodiment is similar to prior art recorders in a user's manual videorecording reservation input method, estimation of a data amount required for the recording, blank disc storage amount investigation, and verification thereof. The recorder of the invention is distinguishable over the known recorders in that it performs unique processing during standby in a way which follows.

First, a recording reservation is done. Then, at a time point whereat it is ascertained that such recording is aimed at an optical disc or discs, the microcomputer 7 obtains from the reservation contents an optical disc region which is preassigned or "scheduled" to be used for the recording—say, a recording-preassigned region. The reservation contents contain therein specific information such as a recording start time-and-date, on-recording picture quality settings and others. Thus it is possible to estimate the exact data storage capacity required for the recording, from a bit rate which is determinable by a recording time length and the image quality setup.

Then, from the estimated necessary data capacity and the blank capacity of optical disc plus a distribution of blank locations, it is possible to define an optical disc region to be recorded, i.e., the recording-preassigned region. More specifically, when acquiring and retaining the necessary data capacity, select the recording-preassigned region from the optical disc's blank locations while causing the recording-preassigned region to reside at a single location without being fragmented into a plurality of separate portions or causing its division number to become as less as possible even when the region must be scattered at multiple portions.

In this way, the microcomputer 7 sets up as the recording-preassigned region one or more regions of the blank storage area of the optical disc 1, which are used for the recording session complying with the videorecording reservation and then sets to a region under investigation either a region that includes at least part of the recording-preassigned region or a partial region therein.

Figure 3A:
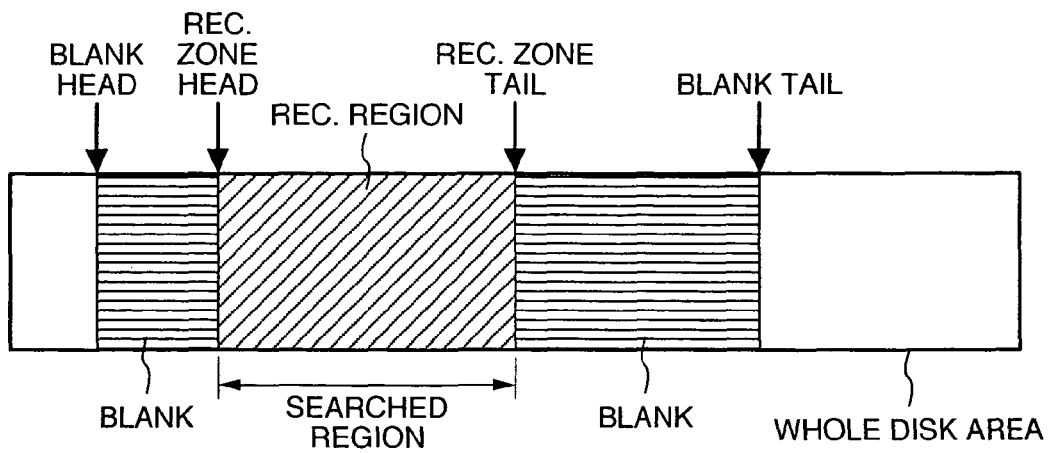
FIGS. 3A to 3C are diagrams for explanation of an optical disc's blank region, recording-preassigned region and to-be-investigated region, respectively.
Figure 3B:
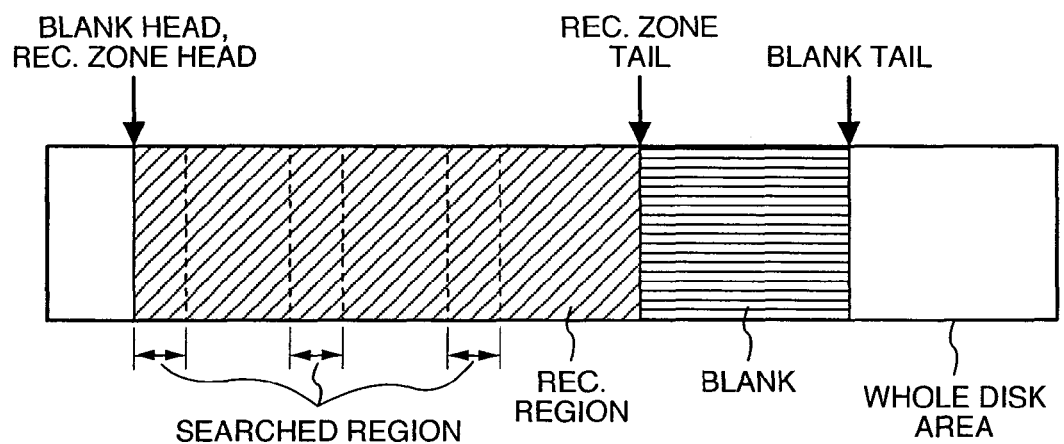
Figure 3C:
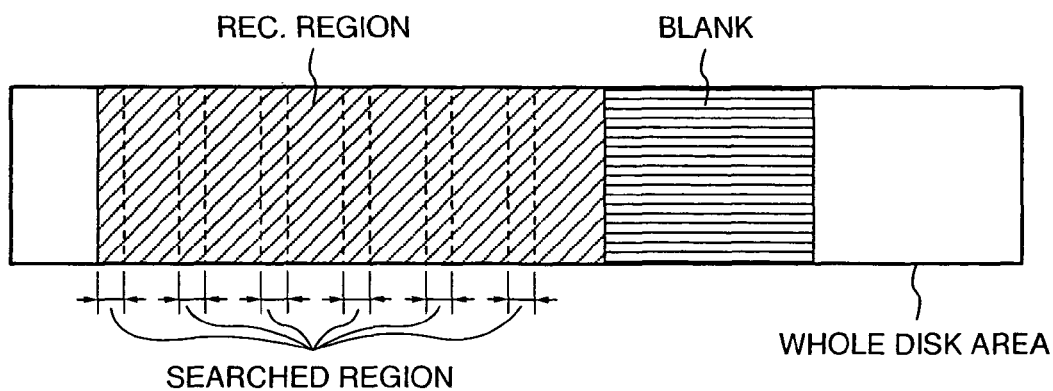

Here, a detailed explanation will be given of a relationship of the recording-preassigned region versus the region to be investigated. FIGS. 3A to 3C are diagrams each pictorially showing the relation between the recording-preassigned region and the region under investigation.

A first example shown in FIG. 3A is the one that makes the recording-preassigned region identical to the under-investigation region. In this case, the recording-preassigned region is entirely subjected to investigation and evaluation, resulting in investigation errors being precluded. Thus it is possible to perform the investigation with high reliability.

A second example shown in FIG. 3B is such that the start position or "head" of a blank region is the same as that of the recording-preassigned region while letting the under-investigation region be a part of the recording-preassigned region with the under-investigation region being thinned out from the recording-preassigned region by a prespecified method. In this case, since the blank region and the recording-preassigned region are identical in start position to each other, any blank region is absent in front of the recording-preassigned region. Thus it is possible to prevent occurrence of a plurality of isolated blank regions, such as blank regions 1 and 2 of the first example. Additionally, letting the under-investigation region be part of the recording-preassigned region makes it possible to perform investigation and evaluation while applying sampling to the recording-preassigned region. This makes it possible to shorten an investigation time period when compared to the case where the whole of the recording-preassigned region is investigated.

A third example shown in FIG. 3C is such that the individual under-investigation region is lessened in size dimension while retaining a data amount ratio of the individual under-investigation region versus the recording-preassigned region during execution of the sampling to the same level of that in the second example. This is aimed at achievement of an ability to detect relatively small abnormalities. More specifically, this is realizable by a process having the steps of setting up the positions and sizes of the under-investigation region and recording-preassigned region in such a way that in case there are disc defects which are greater than or equal to a prespecified size at least one under-investigation region contains such disc defect portions, and then performing setting on the optical disc. In this case, it is possible to investigate the state of the optical disc more precisely and accurately when compared to the second example stated above.

It should be noted that the recorder may be arranged to select one from the first to third examples or alternatively designed to automatically determine, based on the position and size of recording-preassigned region for example, the position and size of under-investigation region while letting the setup of a detectable optical-disc defect size in the above-noted third example be included therein. It is also permissible to show the user a plurality of options in accordance with a time taken for the investigation and/or the disc state and then allow the user to choose therefrom his or her preferred one. Still alternatively, the recorder may be designed to permit the user to manually set up a target region or non-target region according to his or her own judgment.

Next, after completion of the setup of the under-investigation region in the way stated above, calculate an investigation/evaluation time (evaluation time required) which is necessary to investigate and evaluate the optical disc state in this under-investigation region. A further process is to calculate, from a difference between a present time point and the recording preparation start time, a time period (evaluation enable time) consumable for the investigation and evaluation of the optical disc 1.

In cases where the evaluation enable time is greater than or equal in length to the evaluation time needed, perform the investigation and evaluation of optical disc 1. However, in case the evaluation enable time is shorter than the evaluation time, the investigation and evaluation of optical disc 1 are no longer performed because it is evident that the evaluation is incapable of being carried out until completion of the evaluation.

In this case, it is recommendable to modify the investigation conditions by a predetermined method to ensure that the evaluation time does not exceed the evaluation enable time, and thereafter, perform the evaluation de novo. The investigation condition modification is achievable, for example, by using a method for reducing the size of the under-investigation region or reducing investigation items as will be described later.

In the case of execution of the investigation and evaluation, investigate the optical disc state in its to-be-investigated region(s) at an appropriate time point, followed by storing its result in a specified storage medium. An example of the storage medium as used here to store the investigation result is at least one of the recorder's built-in HDD, semiconductor memory and the optical disc to be recorded.

Regarding an investigation/evaluation execution timing, the user is permitted to select one from among some options, such as a time immediately after the timer videorecording reservation, designated time-and-date, and videorecording preparation start time. Alternatively the recorder may be designed to automatically select an appropriate one from these options.

A detailed explanation will next be given of the procedure and contents in the case of executing the optical disc investigation and evaluation. The optical disc investigation and evaluation are performed relative to the optical disc's record/playback characteristics and the states of servo and wobble signals, for example. Note here that the investigation/evaluation contents are determinable while taking account of certain information obtainable from the videorecording reservation data, such as the position and size of a recording-preassigned region and video quality setup data, and also disc information such as a disc manufacturer, disc type or else, which is considered to roughly reflect some kinds of situations, such as the optical disc performance, variation, etc.

The optical disc recorder may also be designed to use the above-noted information to show the user some options of investigation/evaluation contents, including therein a mode for automatic determination of the investigation/evaluation contents, and prompt the user to select this or her preferred one from among them. To be more precise, in case the recording-preassigned region is not scattered in position and is small in size, the optical disc characteristics are predicted to be small in variation within the recording-reeassigned region, so it is possible to reduce in number those portions to be investigated. A method is also employable for simplifying the evaluation items relating to manufacturers who are expected to fabricate high-quality optical discs and also to disc type-dependent fabrication process parameters.

In the case of rewritable discs, even when performing recording to an under-investigation region in order to investigate the record/playback characteristics, such recorded portion for the investigation purpose is erasable later. Owing to this, there are no limitations concerning a region for the investigation use. This makes it possible to perform investigation and evaluation with respect to an entirety of the under-investigation region. In view of this, a method is used which includes the steps of defining record/playback characteristics-investigated portions at appropriate intervals within the under-investigation region, performing a recording operation while actually varying the recording conditions such as on-recording optical power intensity, optical power timing and others, playing back the record result, and then evaluating the same to thereby obtain the optimum recording conditions with respect to the under-investigation region.

However, "write-once" discs are incapable of erasing once-written recording marks, so it is an ordinary approach to eliminate execution of the above-noted evaluation of the record/playback characteristics. Obviously, although in a practical sense it is possible even for write-once discs to investigate the record/playback characteristics in a given user data region and, it is possible after completion of the investigation to evaluate the record/playback characteristics by performing processing with such region as an out-of-use region, but this approach requires complicated processes, such as link processing or else. For this reason, it is desirable to provide default setup which prevents execution of the evaluation of record/playback characteristics in user regions on write-once discs under an initial condition of the optical disc recorder.

For an optical disc or disc which once experienced a recording failure but has many blank regions thereon, it is also possible to effectively use this optical disc by intentionally investigating the certain ratio of a blank space of the optical-disc user region to thereby precisely examine the supportability of such optical disc for succedent recording sessions.

Additionally in rewritable discs, it is desirable to reduce the influenceability upon later-performed recording processing by performing adequate erase processing suitable for the optical disc after completion of the record/playback characteristics evaluation, wherein the erase processing is at least one of the so-called "physical erase" which erases the recording marks per se at evaluation-used portions and the "logical erase" for erasing them logically.

Next, a practically implemented procedure for evaluation of the disc state will be discussed below. The optical-disc state evaluation is chiefly performed by the optical disc drive 2, which is configurable in a way which follows.

FIG. 2 shows a block diagram of the optical disc drive 2. An optical disc 1 is driven by an electric motor 27 to rotate at a specified rotation speed or revolution. An optical pick-up module 20 emits a beam of laser light, which is used to record (write) and reproduce (read) data to and from the optical disc 1 at any given position thereon. The optical pickup 20 outputs an electrical signal, which is then input to a front end circuit 21 for execution of necessary processes, such as amplification, level-shifting, arithmetic operation, equalization and filtering, thereby generating several output signals including but not limited to a servo signal 24, radio frequency (RF) signal 25, and wobble signal 35. The servo signal 24 and RF signal 25 are input to a playback signal processing circuit 22. This playback signal processor circuit 22 performs certain processing such as phase compensation required for servo-control of a focus/tracking actuator (not shown) which is provided inside of the optical pickup 20, thereby to generate a servo control signal 23. Additionally, a signal for control of the revolution of motor 27 as generated at a recording signal processor circuit 33 to be later described is also subject to the processing such as phase compensation required for servo-control of the rotation speed of optical disc 1, resulting in a signal being output as the servo control signal 23.

The servo control signal 23 is amplified by a driver circuit 26 to a level that is necessary to drive the actuator and the motor 27, and is then supplied to the focus/tracking actuator residing within the optical pickup and the motor 27, thereby enabling execution of tracking control relative to a certain position of the optical disc 1 and also the rotation speed control of optical disc 1.

During data reading from the optical disc, the playback signal processor circuit 22 applies to the RF signal 25 several kinds of processing such as binarization, strobe clock signal retrieval, data strobe, data demodulation, decoding and error correction so that playback information 36 is reproduced. This playback information 36 is input to an interface circuit 30 and temporarily stored in a buffer memory 31 with buffering processing applied to the information, which will then be passed through the interface circuit 30 again for outward transmission via an interface bus 34.

During data writing to the optical disc, the data as input to the interface circuit 30 via the interface bus 34 is temporarily stored in the buffer memory 31, and buffering processing is applied thereto. Then, the data is transferred via the interface circuit 30 again and thereafter sent out as record information 32 toward the record signal processor circuit 33. This processor circuit 33 performs for the record information 32 several processes such as encoding, error correction code addition and recording strategy, thereby generating a laser drive signal 37.

The laser drive signal 37 is input to a laser driver circuit (not shown) which is provided in the optical pickup 20. The laser driver circuit is operatively responsive to receipt of the laser drive signal 37, for driving a laser diode assembly (not shown) in such a way as to emit light with prespecified optical power at a predetermined timing.

The wobble signal 35 is input to the record signal processor circuit 33 and is used for wobble clock playback in a phase-locked loop (PLL) circuit (not shown) which is arranged to have synchronizability with the wobble signal. Wobble Signal 35 is also used for detection of wobble signal-superposed address or data, recording clock signal generation based on the wobble signal, and generation of a rotation speed control signal of the motor 27.

Various kinds of signals including the above-noted signals are sent forth and back between the playback signal processor circuit 22 and record signal processor circuit 33.

Operation control of the entire optical disc drive 2 is performed by the microcomputer 28 while sending and receiving control data to and from respective function blocks via a system control bus 29.

A method for evaluating the optical disc 1 in the above-noted optical disc drive 2 will next be described below.

In the evaluation of the optical disc state, it is usually necessary to specify both the optical disc state and a position on the disc surface whereat the evaluation result was obtained. Regarding this issue, the address data as demodulated from the wobble signal simultaneously during observation of various signals to be evaluated is used as disc position information to record together the signal observation result and the address data in a paired form, thereby to facilitate the recording while causing the on-disc position and the state at such position to have a one-to-one correspondence relationship therebetween.

In this case, the address data is one-dimensional (1D) information with a spiral track being expanded into a number line shape, so the data is featured in that its management is easy. Additionally the address data detection is achievable using the record signal processor circuit 33 in the way stated supra.

As for the on-disc position information, other than the above-stated one using the address data, it is also possible to represent it as two-dimensional (2D) information of the type having a polar coordinate format by using a disc-motor rotation angle θ which is detected from the disc motor for rotation of the optical disc and the radius r of a light spot position as detected from the position of a slider which performs position determination in radial directions of the optical pickup, for example. In this case, the processing for representing general positions becomes complicated when compared to the 1D information; on the contrary, there is a feature that the processing becomes easier because of an ability to represent ring-like regions by use of the radius r only.

Note that the radius r is obtainable from the position information of a slider control block (not depicted) used for position control of the optical pickup in radial directions of the optical disc, whereas the disc-motor rotation angle θ is obtainable from the output information of a rotation angle sensor of the motor 27. Also note that the radius r is also acquirable by calculation using address data, track pitch, linear velocity, etc. Furthermore, an appropriate one of the 1D position management based on the address data and 2D position management based on the polar coordinates consisting of the above-noted radius and rotation angle may be used selectively for any purpose in a case-sensitive way.

For example, the optical disc varies in record/playback characteristics mainly due to changes in composition and structure of its recording layer in many cases. Hence, such changes tend to appear in radial directions of the disc. It is unlikely that abnormalities take place locally at a portion of the disc. In view of this, the evaluation of record/playback characteristics may be done while selecting more than two different positions in a radial direction of the disc and taking notice of a change in record/playback characteristics occurring due to the difference of such along-the-radius positions. The region being investigated may be set to a plurality of radius-different ring-like zones.

While the evaluation of record/playback characteristics is actually the process for adequately determining the recording power and record strategy, such as called the OPC and trial writing, these processing schemes and procedures are achievable by various known techniques, although explanations thereof are eliminated herein because the contents and procedure of such techniques per se have no direct relevancy to the invention as disclosed and claimed herein. A principal concept of the invention lies in achievement of an ability to introduce the optimum recording conditions at either an entirety of the to-be-investigated region or a respective portion thereof.

In regard to a method for presuming and introducing the optimum recording conditions at any given position within a recording-preassigned or "scheduled" region on the basis of a plurality of optimal recording conditions obtained relative to a plurality of under-investigation regions, this may be implemented by a chosen technique, such as linear interpolation or polynomial expression interpolation or equivalents thereto.

An explanation will next be given of the investigation and evaluation using the servo signal, wobble signal and address data.

The servo signal, wobble signal and address data are investigatable and evaluatable in a playback state, so it is possible to perform the investigation/evaluation using these signals in a way irrespective of whether the optical disc of interest is a write-once disc or a rewritable one.

First, let an under-investigation region be subject to focus servo and tracking servo operations in a similar way to that in ordinary signal reproduction sessions. During execution of a trace operation, observe a focus-servo error signal, tracking-servo error signal, wobble signal and address data as detected from the wobble signal. The detection of such servo-error and wobble signals is executable by use of the playback signal processor circuit 22 and record signal processor circuit 33 with these signals being input thereto.

Concerning the focus error signal and tracking error signal, more than one threshold value for distinction of a proper range and abnormal range of the signal level and at least one threshold for identification of the degree of abnormality are preset, and when the focus error signal and tracking error signal exceed their corresponding preset thresholds respectively during the focus servo and tracking servo operations, record the states of such signals and on-disc position information while letting them be paired together.

Generally, if defects are found such as disc distortion, recording layer/track-formation faults or the like, then variations of a focus-servo error signal and/or tracking-servo error signal occur at such positions. Thus, identifying the degree of these servo signal variations along with the error-occurred positions makes it possible to determine or "grasp" the defect degree and location.

Next, with regard to the wobble signal, there is preset more than one threshold value for distinction between a proper range and an abnormal range of the signal level and for identification of the degree of abnormality, and when the level of such wobble signal goes beyond the preset threshold, record the state of such signal and on-disc position information in a paired form.

Note here that since the wobble signal is also input to the PLL circuit which is to detect the address data as superposed or "embedded" into the wobble signal, the PLL circuit can sometimes be out of locking when the wobble signal decreases in level or when abnormality occurs in the level. An exemplary approach to avoiding this risk is to employ a circuit for monitoring a present state of the PLL circuit and for recording, upon occurrence of PLL abnormality, a state of PLL at that time and on-disc position information while letting them be paired together.

Further, in view of the fact that the address data is detected from the wobble signal, address data detection failures can take place in some cases, such as address data detection interval disturbance and address data discontinuity, upon occurrence of abnormalities such as wobble signal level reduction and drop-out. Even when such improper detection does not run into the address defection abnormality, it will possibly happen that error detection and error correction processing are performed with respect to the address data.

To avoid this, an attempt may be made to provide a circuit for monitoring the adequacy or propriety of the address data, such as address data detection cycle, detected address data continuity, and situations of error-detection/error-correction processing against the address data. The circuit is arranged to record a state of address data at that time and on-disc position information while letting them be paired together whenever abnormality occurs in the propriety of the address data.

The several kinds of signals thus detected in the way stated above, including but not limited to the servo signal, wobble signal and address data of the under-investigation region within a recording-preassigned region of the optical disc, are recorded together with abnormality occurrence position information to at least one of the recorder's built-in HDD, memory and optical disc. With the processing above, various under-investigation region states are finished to be recorded together with the abnormality occurrence position information, which will be used to determine whether it is possible or not to perform recording to the recording-preassigned region. This recordability determination or "judgment" is based on whether the recording is enabled due to a remedy for disc abnormalities as will be described later.

In case it is determined that the recording is possible within a recording-preassigned region, the recorder is in its standby mode until arrival of a recording preparation start time for the initial reserved videorecording. Thereafter, when it becomes the recording start time, the recording gets started. In the event that a non-recordable region is present within the recording-preassigned region, let this region be out of use for the recording. In this case, set up another or "second" recording-preassigned region which is different from the first recording-preassigned region and which excludes the non-recordable region; then, redo the setting of an under-investigation region with respect to the second recording-preassigned region for execution of necessary investigation to thereby newly determine whether the recording is possible within the recording-preassigned region, followed by taking one of the above-noted actions appropriate for the determination result.

At a reserved timer recording preparation start time point, the recorded is rendered operative or "awaken" by the timer for startup of the recoding preparation processing with respect to the optical disc 1.

In the optical disc recorder of this invention having its built-in HDD and memory plus an optical disc as loaded thereinto with the investigation/evaluation results being prestored in at least one of them, read these results therefrom, and then use this readout information to determine settings as to the servo control, recording speed, wobble-signal/address-data detection, recording power, and recording strategy. In this event, the OPC and/or trial writing may be done in order to ensure that the optical disc drive 2 performs recording to the optical disc 1 under appropriate conditions as in the prior art.

An exemplary technique for determining the above-noted settings will be set forth below.

If there are disc warp and distortion occurred due to optical disc molding/casting process conditions, these badly serve as disturbances against the servo systems. This would result in increases in focus/tracking error signal levels at corresponding locations. To alleviate this influenceability, increase the servo gain at such portions, thereby reducing tracking errors. To this end, perform processing for temporarily increasing the servo gain at portions in close proximity to error occurrence positions on the basis of the presently stored servo error states and occurrence locations. In case the disturbance is larger than expected, mere use of this temporal servo-gain increase process is deficient in the ability to suppress such tracking errors. If this is the case, it is required to force the disc to decrease in rotation speed to thereby lower its linear velocity whereby the disturbance frequency is lowered so that the effective servo gain increases, resulting in a likewise decrease in tracking errors.

In this case the recording speed also decreases due to the dropdown of the disc rotation speed. To avoid this, a need is felt to reduce the disc rotation speed down to a recording speed whereat the error signal level is less than or equal to a predetermined value. Usually the optical disc's recording speed is kept constant during its recording session-it is not assumed that the recording speed is made variable during recording. In view of this, when it is judged that the need arises to lessen the disc rotation speed, the recording speed is set in advance to a lowered level of necessary recording speed prior to startup of the intended recording; then, perform the reserved videorecording at this preset recording speed ab initio.

Next, suppose that local recording-layer abnormality occurs due to the presence of dust and contaminants or else being attached to a stamper during optical disc fabrication processes. In this case, there are tow occasions, one of which is capable of dealing with them by taking corrective measures that are the same as those for the above-noted warp and distortion, and the other of which is incapable of doing so. In the former case, the procedure therefore is the same as that stated supra so that its explanation is omitted here. In the latter case, in view of the fact that the recording layer often accompanies risk of irregular reflectivity, specific processing is performed for temporarily lowering the servo gain at the related portions to ensure that the servo system are free from behavior turbulence otherwise occurring due to the influence of disturbance or for holding it to thereby prevent receipt of any appreciable disturbance influence of the servo system's error signal(s).

Alternatively, in the case of track-shape abnormality occurring due to optical-disc stamper fabrication conditions, the same method as that in the latter case relating to the above-noted recording-layer abnormality is employable for dealing with this kind of abnormality.

For disc-surface scratches and contamination occurring due to improper optical-disc handling, a process is done in the case of scratches in such a way as to temporarily lower the servo gain at such damaged portions to ensure that the servo system is out of behavior turbulence otherwise occurring due to the influence of disturbance or to hold it in such a way as to preclude disturbance influenceability of servo system's error signal(s). In case the contamination covers a relatively wide area of the optical disc surface, the servo system can loose its trackability.

In this case, eliminate the use of such contaminated area, and perform recording to another problem-less area while letting the defective area be out of use. In the case of skipping the defective region, the optical disc decreases in its substantial recordable capacity. A significant decrease in this capacity sometimes results in failure to record the whole contents of a timer videorecording-reserved broadcast program. In such case, the user is prompted to take his or her preferred action by selecting one from the recorder-recommended options—i.e., replace a presently loaded optical disc with another, or perform cleaning of the disc, or changing the aimed recording medium from the disc to the built-in HDD. If no instructions are returned from the user, or alternatively, in case the recorder is programmed in advance to select a prespecified method in such case, this method is automatically selected by the recorder.

Additionally in case these situations are presumable, the recorder is arranged to offer capabilities of performing disc state evaluation immediately after having made the timer videorecording reservation and then notifying the user of check results. With such an arrangement, it is possible to allow the user to leisurely choose his or her preferred alternative processing within an increased length of time period.

The recording layer's state change with time and peel-off of laminated disc portions due to disc fabrication conditions and improper disc handling span a wide area of disc surface from time to time. In this case, a disc state indicating the lack of recordability is noticed to the user at the time such state was ascertained while showing exemplary corrective measures, such as disc replacement or temporal recording to HDD to thereby prompt the user to take an action. If no instructions are available from the user, or alternatively, in case the recorder is designed in advance to select a predetermined method, this "default" method is automatically selected by the recorder.

Regarding the wobble signals also, it is necessary to perform the above-stated investigation/evaluation method-adaptive processing. It is also required to take adequate corrective measures including, but not limited to, modifying the response speed of a wobble signal automatic gain control (AGC) circuit according to wobble signal level variation situations, increasing the wobble signal amp gain, and holding in vicinity of wobble PLL's abnormality occurrence portions.

In cases where the abnormality as to address data detection is predicted, the digital signal processor circuit is enhanced in address protection function, thereby causing the address data interpolation and address detection/judgment to have increased robustness against address aberrance.

According to the embodiment stated supra, it is possible to obtain higher recording quality by investigating and evaluating the disc state that affects the recording quality in a to-be-recorded region(s) on a target disc being recorded and then appropriately modifying, based on the results in a case-by-case basis, several videorecording conditions such as the recording rate, on-recording optical power, recording strategy setup, servo control setup, PLL control system setup, wobble signal detection system setup and address signal detection system setup and so forth. By doing so, it is also possible to reduce the possibility of recording failure occurrence.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc recording device comprising:
   an optical disc recorder which records information on a recordable region of an optical disc;
   a signal output unit which outputs recording information to said optical disc recorder;
   a control unit which controls said optical disc recorder and said signal output unit;
   a record information setup unit which sets in said control unit contents of information to be recorded; and
   said optical disc recording device performing a process including,
      determining a size for a region of the recordable region of said optical disc based on the contents of information to be recorded,
      defining, based on the contents as set to said control unit by said information setup unit, the region of the recordable region of said optical disc which is scheduled to be used for recording as a recording-reserved region,
   said control unit performing steps of:
      setting at least a portion of the recording-reserved region as an under-investigation region,
      calculating an investigation/evaluation time necessary to investigate and evaluate the optical disc state in the under-investigation region and an evaluation enable time consumable for the investigation and evaluation of the optical disc,
      when the evaluation enable time is greater than or equal to the investigation/evaluation time, then the investigation and evaluation of the optical disc is performed and when the evaluation enable time is shorter than the investigation/evaluation time, then the investigation and evaluation of the optical disc is not performed,
   said optical disc recording device further performing a process including,
      investigating a physical state of the recording-reserved region before said optical disc recorder records the information as set to said control unit by said record information setup unit, and
      setting, based on an investigation result, certain recording conditions in a recording event of said optical disc recorder.

2. The optical disc recording device according to claim 1, wherein said signal output unit is a tuner operative to receive and demodulate a signal as arrived thereto from an outside of said optical disc recording device and then output image/audio information.

3. The optical disc recording device according to claim 1, wherein the certain recording conditions in the recording event of said optical disc recorder include at least one or more of servo control-related setup, recording speed-related setup, wobble signal detection-related setup, address information signal detection-related setup, recording power-related setup, recording strategy-related setup, and a recording position.

4. The optical disc recording device according to claim 1, wherein after having investigated the state of the recording-reserved region said device goes into standby and, after recovery from the standby by a timer, sets up the certain recording conditions in the recording event of said optical disc recorder based on investigation results.

5. An optical disc recording device comprising:
   an optical disc recorder which records information in a recordable region of an optical disc;
   a signal output unit which outputs recording information to said optical disc recorder;
   a control unit which controls said optical disc recorder and said signal output unit;
   a record information setup unit which sets in said control unit contents of information to be recorded; and
   said optical disc recording device performing a process including,
      determining a size for a region of the recordable region of said optical disc based on the contents of information,
      defining, based on the contents as set to said control unit by said information setup unit, the region of the recordable region of said optical disc which is scheduled to be used for recording as a recording-reserved region, and
      investigating a physical state of the recording-reserved region before said optical disc recorder records the information as set to said control unit by said record information setup unit,
      wherein when a result of the investigation indicates that the optical disc is not recordable, then
         said control unit shows to a user exemplary corrective measures including disc replacement and temporarily recording to a hard disk device to thereby prompt the user to take an action, if no instructions are received from the user, or alternatively,
         a predetermined action is performed, if the optical disk recording device is configured to do so.

6. An optical disc recording device comprising:
   optical disc recorder which records information in a recordable region of an optical disc;
   signal output unit which outputs recording information to said optical disc recorder;

control unit which controls said optical disc recorder and said signal output unit; and record information setup unit which sets in said control unit contents of information to be recorded;

said device performing a process including,
- determining a size for a region of the recordable region of said optical disc based on the contents of information to be recorded, and
- defining, based on the contents as set to said control unit by said information setup unit, the region of the recordable region of said optical disc which is scheduled to be used for recording as a recording-reserved region, wherein said control unit performing steps of:
- determining investigation/evaluation contents based on disc information obtainable from a disc manufacturer or disc type,
- investigating a physical state of the recording-reserved region in accordance with said investigation/evaluation contents before said optical disc recorder records the information as set to said control unit by said record information setup unit, and
- setting, based on an investigation result, certain recording conditions in a recording event of said optical disc recorder.

7. An optical disc recording device comprising:

optical disc recorder which records information in a recordable region of an optical disc;

signal output unit which outputs recording information to said optical disc recorder;

control unit which controls said optical disc recorder and said signal output unit; and record information setup unit which sets in said control unit contents of information to be recorded;

said device performing a process including,
- determining a size for a region of the recordable region of said optical disc based on the contents of information to be recorded, and
- defining, based on the contents as set to said control unit by said information setup unit, the region of the recordable region of said optical disc which is scheduled to be used for recording as a first recording-reserved region,
- investigating a physical state of the first recording-reserved region before said optical disc recorder records the information as set to said control unit by said record information setup unit, and wherein said control unit performs steps of;
- setting up a second recording-reserved region which is different from said first recording-reserved region and which excludes a non-recordable region, when a result of the investigation indicates that a non-recordable region is present within the first recording-reserved region,
- setting an under-investigation region with respect to the second recording-reserved region for execution of necessary investigation to thereby newly determine whether the recording is possible within the second recording-reserved region, and
- setting, based on an investigation result, certain recording conditions in a recording event of said optical disc recorder, when it is determined that the recording is possible within the second recording-reserved region.

8. An optical disc recording device comprising:

optical disc recorder which records information in a recordable region of an optical disc;

signal output unit which outputs recording information to said optical disc recorder;

control unit which controls said optical disc recorder and said signal output unit; and record information setup unit which sets in said control unit contents of information to be recorded;

said device performing a process including,
- determining a size for a region of the recordable region of said optical disc based on the contents of information to be recorded, and
- defining, based on the contents as set to said control unit by said information setup unit, the region of the recordable region of said optical disc which is scheduled to be used for recording as a recording-reserved region, and
- investigating a physical state of the recording-reserved region before said optical disc recorder records the information as set to said control unit by said record information setup unit, wherein said control unit, when a result of the investigation indicates that a disc state is the lack of recordability, shows to a user exemplary corrective measures of disc replacement or temporal recording to HDD to thereby prompt the user to take an action, if no instructions are available from the user, or alternatively, in case the recorder is designed in advance to take a predetermined operation, said predetermined operation is automatically performed.

* * * * *